United States Patent Office 2,788,345
Patented Apr. 9, 1957

2,788,345
NEW AZO-DYESTUFFS

Walter Hanhart, Riehen, Switzerland, assignor to Ciba Limited, Basel, Switzerland, a Swiss firm No Drawing. Application October 11, 1954,
Serial No. 461,681

Claims priority, application Switzerland October 23, 1953

12 Claims. (Cl. 260—157)

This invention provides valuable new azo-dyestuffs of the formula (1)
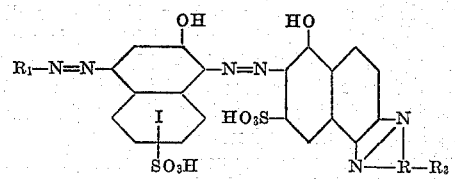

in which $R_1$ represents the radical of a hydroxybenzene-ortho-carboxylic acid or a heterocyclic radical having a 5-membered hetero-ring which contains at least two hetero-atoms of which at least one is an exclusively cyclically bound nitrogen atom, and $R_3$ represents a radical which contains a total of three benzene nuclei of which the end benzene nucleus is substituted by a hydroxyl group and a carboxylic acid group in ortho-position to the hydroxyl group and two of the three aforesaid benzene nuclei are bound together by an azo linkage, and in which the sulfonic acid group is bound to a β-carbon atom of the 6-membered ring I.

The invention also provides a process for making the azo-dyestuffs of the above general Formula 1, wherein a complex copper compound of such azo-dyestuff is de-coppered.

The copper compounds used as starting materials for the process are obtained by treating an azo-dyestuff of the general formula (2)
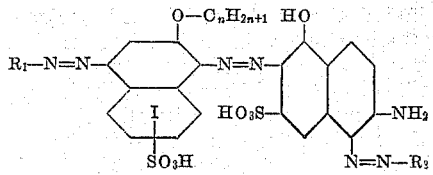

in which $R_1$ and $R_3$ have the meanings given above, and $n$ represents a whole number not greater than 2, with an agent yielding copper, under conditions such that the ortho:ortho'-dihydroxy-azo-copper complex is formed with the splitting off of the group —$C_nH_{2n+1}$ and the ortho-amino-azo-grouping is oxidized to a triazole ring.

The azo-dyestuffs of the general Formula 2 can be made by coupling a diazo-compound of an amino-monoazo-dyestuff of the general formula (3)
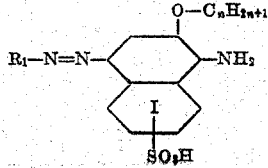

in which $R_1$ represents the radical of a hydroxybenzene-ortho-carboxylic acid or a heterocyclic radical containing a 5-membered hetero-ring which contains at least two hetero-atoms of which at least one is an exclusively cyclically bound nitrogen atom, and $n$ represents a whole number not greater than 2, and in which the sulfonic acid group is bound to a β-carbon atom of the 6-membered ring I in an alkaline medium with a compound of the general formula (4)
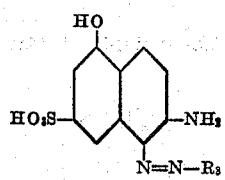

in which $R_3$ represents a radical containing a total of three benzene nuclei of which the end benzene nucleus is substituted by a hydroxyl group and a carboxylic acid group in ortho-position to the hydroxyl group, and two of the three aforesaid benzene nuclei are connected together by an azo linkage.

The amino-monoazo-dyestuffs of the Formula 3 can be made by coupling a diazo-compound of an amine of the formula $R_1$—$NH_2$ with a 1-amino-2-methoxy- or ethoxy-naphthalene-6- or 7-sulfonic acid. As amines of the formula $R_1$—$NH_2$ there come into consideration, for example, amino-hydroxybenzene carboxylic acids of which the hydroxyl and carboxylic acid groups are in ortho-position relative to one another, such as 4-amino-1-hydroxybenzene-2-carboxylic acid.

With advantage there may be used amines of the formula $R_1$—$NH_2$ which contain a hetero-ring of the kind defined above. The —$NH_2$ group may be bound directly to this ring, but it may be bound to an aromatic ring, for example, to a benzene ring, which is either linked to the aforesaid hetero-ring by a simple direct bond or is fused thereto (that is to say, in the latter case two ring carbon atoms of the aromatic ring also form part of the hetero-ring). The hetero-ring contains at least two hetero-atoms, of which at least one is an exclusively cyclically bound nitrogen atom, that is to say, a nitrogen atom of which all three valences are taken up in ring formation. The production of the dyestuffs of the present invention is facilitated by starting from initial components which are free from hydroxyl groups which impart a capacity for coupling to the component.

Valuable results are obtained, for example, with diazo-compounds of the formula $R_1$—$NH_2$ in which the amino group is bound to a benzene ring of which two vicinal ring carbon atoms also form part of a 5-membered hetero-ring containing at least two nitrogen atoms, at least one of the said nitrogen atoms being an exclusively cyclically bound nitrogen atom.

As examples of suitable initial components there may be mentioned the following compounds:

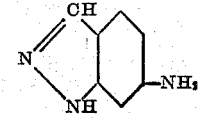

6-amino-indazole

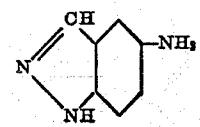

5-amino-indazole

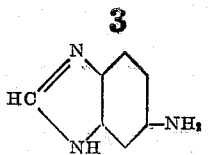

6-aminobenzimidazole

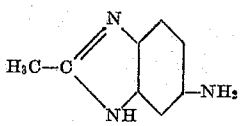

2-methyl-6-amino-benzimidazole

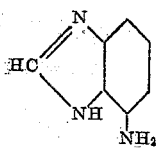

7-aminobenzimidazole

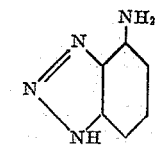

4- or 7-aminobenztriazole

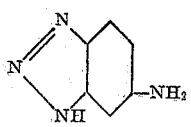

6-aminobenztriazole

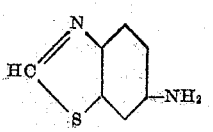

6-aminobenzthiazole and also compounds of the formulae

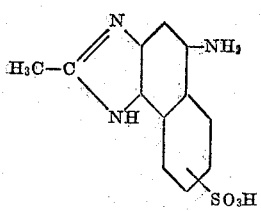

(subsequently sulfonated, but position of the sulfonic acid group is uncertain)

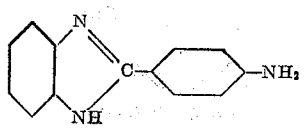

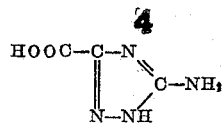

The starting materials of the Formula 4 are made by coupling 2-amino-5-hydroxynaphthalene-7-sulfonic acid in an acid medium with a diazo-compound of the formula $R_3$—X, in which X represents a diazotizable amino group. The radical $R_3$ contains a total of three benzene nuclei and the end benzene nucleus, that is to say, the benzene nucleus furthest from the diazotized —$NH_2$ group, is substituted by a hydroxyl group and a carboxylic acid group in ortho-position to the hydroxyl group. Two of the three benzene nuclei, for example, the two end benzene nuclei are connected together by an azo linkage. The third benzene nucleus may be connected, for example, by a bridge member such as a —CO—NH— group or a direct bond. Apart from the substituents already mentioned, the benzene nuclei of the radical $R_3$ may contain further substituents, for example, halogen atoms such as chlorine, or alkyl or alkoxy groups of low molecular weight. It is generally of advantage for the diazotized —$NH_2$ group, the bonds between the several benzene nuclei and the hydroxyl group of the end benzene nucleus all to be in para-position relatively to one another.

Valuable results are obtained, for example, with diazo compounds of the constitution $$X—R_4—N=N—R_5$$

in which X represents a diazotized amino group, $R_4$ represents a diphenyl radical bound in the 4- and 4'-positions to the group X and the azo linkage, and $R_5$ represents the radical of a hydroxybenzene ortho-carboxylic acid bound to the azo linkage in para-position relatively to the hydroxyl group. Such compounds can be made in known manner by coupling on one side a tetrazotized 4:4'-diaminodiphenyl such, for example, as 3:3'-dimethyl-, 3:3'-dichloro-, 3:3'-dimethoxy-4:4'-diaminodiphenyl or 4:4'-diaminodiphenyl itself with a hydroxybenzene ortho-carboxylic acid capable of coupling. As such coupling components there come into consideration, 5- or 6-methyl-1-hydroxybenzene-2-carboxylic acid, 6-chloro-1-hydroxybenzene 2-carboxylic acid and especially 1-hydroxybenzene-2-carboxylic acid.

The diazo compounds of the amino-azo-dyestuffs, which corresponds to the Formula 3, are coupled with compounds of the Formula 4 in an alkaline medium, for example a medium rendered alkaline with an alkali carbonate, if desired with the addition of a suitable agent assisting the coupling, such as alcohol of pyridine.

The resulting dyestuffs of the Formula 2 are then treated with an agent yielding copper under conditions such that the group —$C_nH_{2n+1}$ is split off with the formation of the ortho:ortho'-dihydroxy-azo-copper complex and oxidation occurs to form the triazole ring. As agents yielding copper there come into consideration more especially the copper tetrammine complexes obtainable in known manner from copper salts and ammonia or organic bases such as pyridine or ethanolamines. In order that the treatment with the agent yielding copper shall lead to the formation of the ortho:ortho'-dihydroxy-azo-copper complex with the splitting off of the methyl or ethyl group and also oxidation to form the triazole ring, energetic reaction conditions are usually necessary, that is to say, prolonged reaction at a raised temperature, for example, in the vicinity of the boiling temperature of the aqueous reaction medium, and also a substantially larger proportion of the agent yielding copper than one atomic proportion of copper per molecular proportion of dyestuff. Good results are obtained, for example, with about 4 atomic proportions of copper per molecular proportion of dyestuff, whereby, in addition to the reactions mentioned above, the formation of a complex occurs also at the end ortho-hydroxy-carboxylic acid groups or at the heterocyclic rings which may be present in the radical R₁.

By the treatment with an agent yielding copper there is obtained a complex copper compound of a dyestuff of the Formula 1. The resulting copper compound is then decoppered. The decoppering may be carried out in known manner, for example, with the aid of salts of hydrosulfuric acid or advantageously by treatment with hydrochloric acid of high concentration in the cold, that is to say, at about room temperature. Furthermore the copper compounds may be decoppered by means of dilute hydrochloric acid at a raised temperature or by means of an alkaline solution of an alkali cyanide. The dyestuffs resulting from decoppering in an acid medium are advantageously reconverted into their sodium salts by means of an alkali.

The copper-free dyestuffs corresponding to the above Formula 1 are suitable for dyeing and printing a very wide variety of materials, for example, those of animal origin such as wool, silk or leather but especially for dyeing or printing cellulose-containing materials such as cotton, linen, and artificial silk or staple fibers of regenerated cellulose. They may also be treated with an agent yielding metal, advantageously an agent yielding copper, on the fiber or in the dyebath. For this purpose there are especially suitable those dyestuffs which contain no sulfonic acid groups other than those shown in the formula. The treatment with the agent yielding metal may be carried out in known manner, for example, on the fiber or in a single bath in part in the dyebath itself and in part on the fiber. It is of advantage to use the process, for example of U. S. Patent No. 2,148,659 in which there are carried out in the same bath first the dyeing and then the treatment with the agent yielding metal. As agents yielding metal there come into consideration more especially those which are stable towards alkaline solutions, such as complex copper tartrates or alkali copper pyrophosphates.

In some cases especially valuable dyeings can be produced by the process in which a dyeing or print produced with the metal-free dyestuff is after treated with an aqueous solution which contains a basic formaldehyde condensation product of a compound containing at least once the atomic grouping.

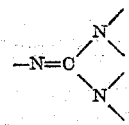

for example, dicyandiamide or dicyandiamidine, or a compound, for example, cyanamide, which can easily be converted into a compound containing the aforesaid atomic grouping, and which solution also contains a water-soluble, more especially a complex, copper compound. Such a process is described, for example, in British Patent No. 619,969.

The dyeings produced with the new dyestuffs in the manner described above are generally distinguished by their good properties of fastness, especially by their good fastness to light and washing.

The following examples illustrate the invention, the parts being by weight unless otherwise stated.

*Example 1*

10.6 parts of the sodium salt of the azo-dyestuff of the formula

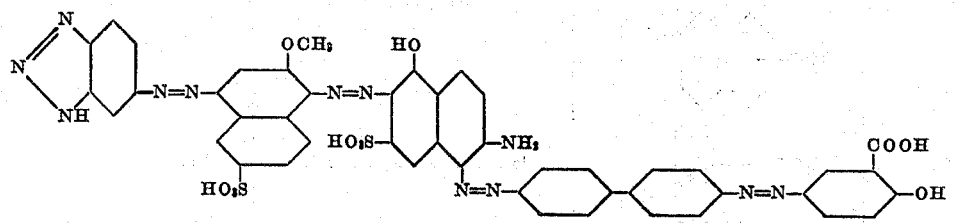

(obtained by coupling diazotized 6-aminobenztriazole with 1 - amino - 2 - methoxy - naphthalene - 6 - sulfonic acid followed by diazotization of the monoazo-dyestuff and coupling with the disazo-dyestuff obtained by coupling tetrazotized 4:4'-diaminodiphenyl on the one hand in an alkaline medium with 2-hydroxybenzene-1-carboxylic acid and, on the other, in an acid medium with 2 - amino - 5 - hydroxynaphthalene - 7 - sulfonic acid) are stirred in 200 parts of water and the mixture is heated to 95° C. There is then added an ammoniacal solution of copper oxide prepared from 10 parts of crystalline copper sulfate, 40 part of water and 20 parts of an ammonia solution of 24 percent strength, and the whole is stirred for about 4 hours at 90–95° C. The precipitated copper compound is filtered off after cooling. In order to remove the copper, the compound is stirred in 160 parts of hydrochloric acid of 30 percent strength for 3 hours in the cold. The mixture is then diluted with water, filtered, and the filter residue is washed with water or a dilute solution of sodium chloride. After converting the dyestuff in the usual manner into its sodium salt and drying it, the dyestuff is a green-black powder which dissolves in concentrated sulfuric acid with a red-brown coloration and in water with an olive-green coloration. It produces on vegetable fibers by the single bath or 2-bath after-coppering process olive-green tints which are fast to washing and light.

The decoppering may also be carried out with dilute hydrochloric acid at a raised temperature or by treatment with an alkaline solution of sodium cyanide.

In the following table are given further trisazo-dyestuffs obtainable in the manner described above. Thus, the diazo-azo compounds given in column III are coupled in an acid medium with 2-amino-5-hydroxynaphthalene-7-sulfonic acid, and the resulting disazo-dyestuffs are coupled in an alkaline medium with the diazo compounds of the aminomono-dyestuffs obtained from the initial components given in column I and the middle components given in column II, the tetrakisazo-dyestuffs are then converted in the manner described into the ortho:ortho'-dihydroxy-azo-copper complexes with the simultaneous oxidation of the ortho-amino-azo-grouping to the triazole ring, and the copper is finally removed. The dyestuffs so obtained yield by the single bath or two-bath after-coppering process on cellulose-containing fibers fast olive dyeings.

| | Diazo-compound (to be coupled with the disazo-dyestuff obtained according to column III) of the amino-monoazo-dyestuff from | | Diazo-azo-compound to be coupled in acid medium with 2-amino-5-hydroxynaphthalene-7-sulfonic acid |
|---|---|---|---|
| | Initial component I | Middle component II | III |
| 1 | 5-amino-indazole | 1-amino-2-methoxynaphthalene-6-sulfonic acid. | tetrazotized 4:4'-diaminodiphenyl, coupled on one side with 1-hydroxybenzene-2-carboxylic acid. |
| 2 | 6-amino-indazole | do | Do. |
| 3 | 7-amino-indazole | do | Do. |
| 4 | 5-aminobenzimidazole | do | Do. |
| 5 | 2-methyl-6-aminobenzimidazole | do | Do. |
| 6 | 7-amino-benzimidazole | do | Do. |
| 7 | 6-amino-benzthiazole | do | Do. |
| 8 | 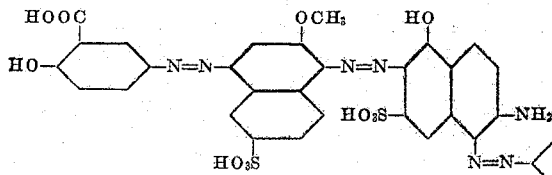 | do | Do. |
| 9 | 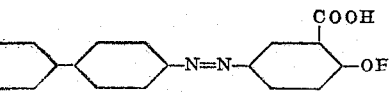 | do | Do. |
| 10 | 6-aminobenztriazole | 1-amino-2-ethoxynaphthalene-6-sulfonic acid. | Do. |
| 11 | do | 1-amino-2-methoxynaphthalene-6-sulfonic acid. | tetrazotized 4:4'-diaminodiphenyl, coupled on one side with 6-chloro-1-hydroxybenzene-2-carboxylic acid. |
| 12 | do | do | tetrazotized 4:4'-diaminodiphenyl, coupled on one side with 6-methyl-1-hydroxybenzene-2-carboxylic acid. |
| 13 | do | do | tetrazotized 3:3'-dimethoxy-4:4'-diamino-diphenyl, coupled on one side with 1-hydroxybenzene-2-carboxylic acid. |
| 14 | do | do | tetrazotized 1-amino-4-(4'-aminobenzoylamino)-benzene, coupled on one side with 1-hydroxy-benzene-2-carboxylic acid. |
| 15 | do | do | diazo-compound of the aminoazo-dyestuff of the formula: 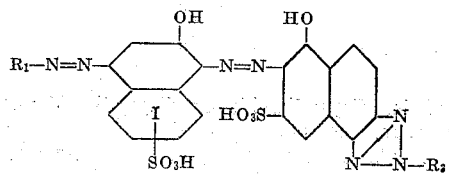 |

Example 2

10.8 parts of the sodium salt of the tetrakisazo-dyestuff of the formula obtainable in known manner are heated in 200 parts of water and 200 parts of pyridine to about 95° C. There is then added an ammoniacal solution of copper oxide prepared from 10 parts of crystalline copper sulfate, 40 parts of water and 25 parts of a solution of ammonia of 24 percent strength, and the whole is stirred for about 6 hours at 90–95° C. After cooling the mixture, it is diluted with water, and the precipitated dyestuff is filtered off and de-metallized by stirring it for 3 hours in cold hydrochloric acid of 30 percent strength. The mixture is then diluted with water, filtered, and the filter residue is washed with water. The dyestuff is converted into its sodium salt in the usual manner and dried. There is obtained a greenish black powder which dissolves in concentrated sulfuric acid with a red-brown coloration and in water with an olive green coloration. The coppered dyeings on cotton are olive green and fast to washing and light.

Example 3

100 parts of cotton are entered at 50° C. into a dyebath which contains 4000 parts of water, 1.5 parts of the decoppered dyestuff obtained as described in Example 1 and 2 parts of anhydrous sodium carbonate. The temperature of the dyebath is raised to 90–95° C. in the course of 20 minutes, 40 parts of crystalline sodium sulfate are added, and dyeing is carried on for 30 minutes at 90–100° C., then the bath is allowed to cool to about 70° C., and 3 parts of complex sodium copper tartrate of approximately neutral reaction are added, coppering is carried on at about 80° C. for about ½ hour, and then the dyeing is rinsed with cold water. If desired, the dyeing may be soaped by after-treatment with a solution which contains 5 parts of soap and 2 parts of anhydrous sodium carbonate in 1000 parts of water. There is obtained an olive green dyeing of good fastness to washing and light.

What I claim is:
1. An azo-dyestuff of the formula in which $R_1$ represents a member selected from the group consisting of the radical of a hydroxybenzene-ortho-carboxylic acid, an indazole radical, a benzimidazole radical, a benzthiazole radical and a benztriazole radical, and $R_3$ represents a radical containing a total of 3 benzene nuclei of which the end benzene nucleus is substituted by a hydroxyl group and a carboxylic acid group bound in ortho position to the hydroxyl group two of the three benzene nuclei being bound together by an azo linkage, and in which dyestuff the sulfonic acid group is bound to a $\beta$-carbon atom of the six-membered ring I.

2. An azo-dyestuff of the formula

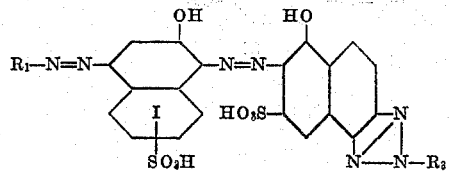

in which $R_1$ represents a radical of a hydroxybenzene-ortho-carboxylic acid, and $R_3$ represents a radical containing a total of 3 benzene nuclei of which the end benzene nucleus is substituted by a hydroxyl group and a carboxylic acid group bound in ortho position to the hydroxyl group two of the three benzene nuclei being bound together by an azo linkage, and in which dyestuff the sulfonic acid group is bound to a $\beta$-carbon atom of the six-membered ring I.

3. An azo-dyestuff of the formula

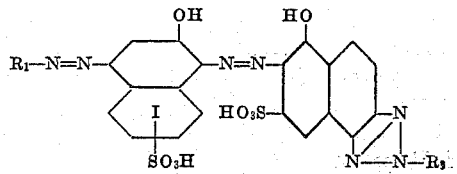

in which $R_1$ represents a benztriazole radical, and $R_3$ represents a radical containing a total of 3 benzene nuclei of which the end benzene nucleus is substituted by a hydroxyl group and a carboxylic acid group bound in ortho position to the hydroxyl group two of the three benzene nuclei being bound together by an azo linkage, and in which dyestuff the sulfonic acid group is bound to a $\beta$-carbon atom of the six-membered ring I.

4. An azo-dyestuff of the formula

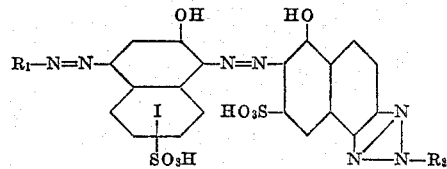

in which $R_1$ represents a benzimidazole radical, and $R_3$ represents a radical containing a total of 3 benzene nuclei of which the end benzene nucleus is substituted by a hydroxyl group and a carboxylic acid group bound in ortho position to the hydroxyl group two of the three benzene nuclei being bound together by an azo linkage, and in which dyestuff the sulfonic acid group is bound to a $\beta$-carbon atom of the six-membered ring I.

5. An azo-dyestuff of the formula

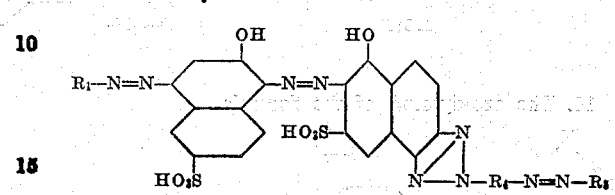

in which $R_1$ represents a radical of a hydroxybenzene-ortho-carboxylic acid, $R_4$ represents a diphenyl radical bound in the 4- and 4'-positions to the triazole ring and the azo linkage, and $R_5$ represents the radical of a hydroxybenzene-ortho-carboxylic acid bound to the azo linkage in para-position to the hydroxyl group.

6. An azo-dyestuff of the fromula

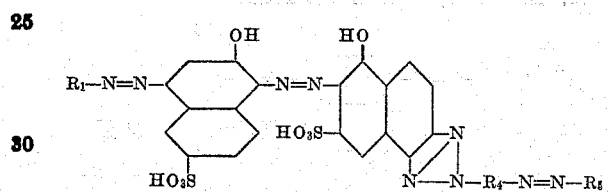

in which $R_1$ represents a benztriazole radical, $R_4$ represents a diphenyl radical bound in the 4- and 4'-position to the triazole ring and the azo linkage, and $R_5$ represents the radical of a hydroxybenzene-ortho-carboxylic acid bound to the azo linkage in para-position to the hydroxyl group.

7. An azo-dyestuff of the formula

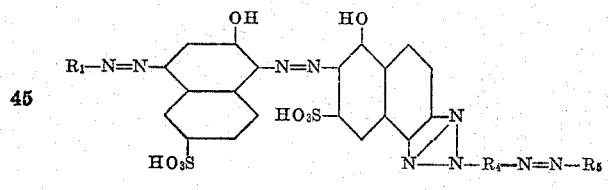

in which $R_1$ represents a benzimidazole radical, $R_4$ represents a diphenyl radical bound in the 4- and 4'-positions to the triazole ring and the azo linkage, and $R_5$ represents the radical of a hydroxybenzene-ortho-carboxylic acid bound to the azo linkage in para-position to the hydroxyl group.

8. The azo-dyestuff of the formula

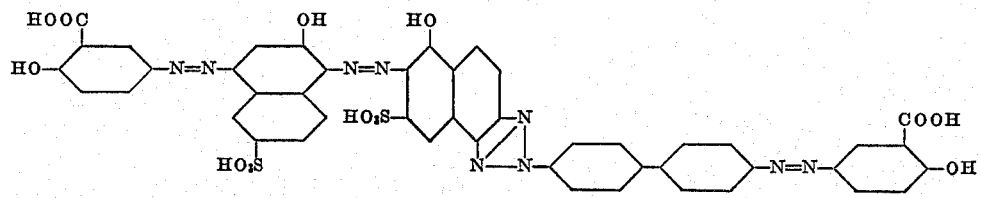

9. The azo-dyestuff of the formula

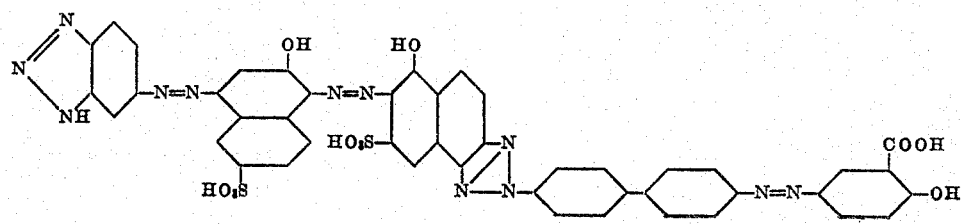

10. The azo-dyestuff of the formula
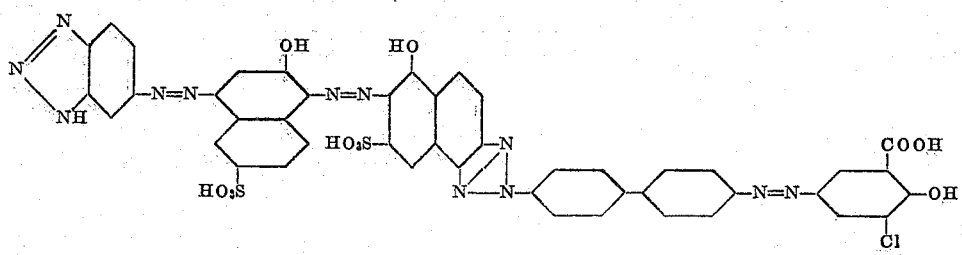
11. The azo-dyestuff of the formula
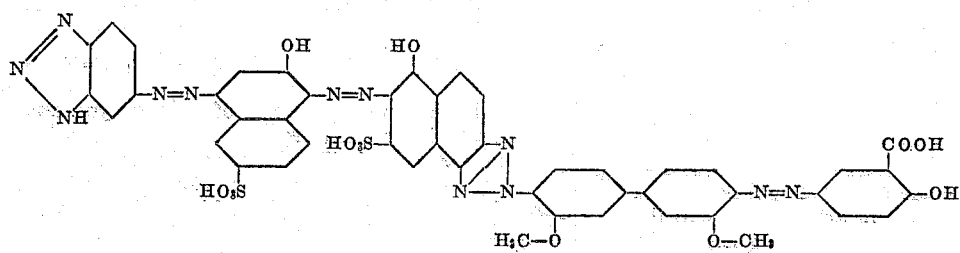
12. The azo-dyestuff of the formula
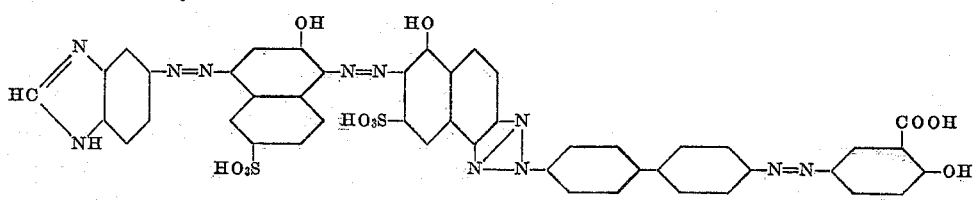
References Cited in the file of this patent
UNITED STATES PATENTS
2,268,935    Hanhart _____ Jan. 6, 1942